(12) United States Patent
Chopra et al.

(10) Patent No.: US 6,488,870 B1
(45) Date of Patent: Dec. 3, 2002

(54) ENCAPSULATION PROCESS

(75) Inventors: Naveen Chopra, Oakville (CA); Peter M. Kazmaier, Mississauga (CA); Paul J. Gerroir, Oakville (CA)

(73) Assignee: Xerox Corporation, Stamford, CT (US)

( * ) Notice: Subject to any disclaimer, the term of this patent is extended or adjusted under 35 U.S.C. 154(b) by 11 days.

(21) Appl. No.: 09/723,187

(22) Filed: Nov. 27, 2000

(51) Int. Cl.$^7$ .............................. B01J 13/02; C08F 2/32
(52) U.S. Cl. ................ 264/4.1; 428/402.2; 428/402.21; 428/402.24; 428/206; 106/31.25; 106/31.26; 106/31.33; 106/31.4; 524/801; 264/4.3; 264/4.33
(58) Field of Search ............... 428/402.2, 402.21, 428/402.24, 206; 106/31.25, 31.26, 31.33, 31.4; 524/801; 264/4.1, 4.3, 4.33

(56) References Cited

U.S. PATENT DOCUMENTS

| | | | |
|---|---|---|---|
| 4,808,408 A | 2/1989 | Baker et al. | 424/408 |
| 5,262,098 A | 11/1993 | Crowley et al. | 264/8 |
| 5,344,594 A | 9/1994 | Sheridon | 264/4.1 |
| 5,540,927 A | 7/1996 | Jason et al. | 424/408 |
| 5,604,027 A | 2/1997 | Sheridon | 428/323 |
| 5,723,204 A | 3/1998 | Stefik | 428/206 |
| 5,930,026 A | 7/1999 | Jacobson et al. | 359/296 |
| 5,961,804 A | 10/1999 | Jacobson et al. | 204/606 |
| 6,067,185 A | 5/2000 | Albert et al. | 359/296 |
| 6,110,444 A | 8/2000 | Klaveness et al. | 424/9.52 |

OTHER PUBLICATIONS

"Kirk–Othmer Encyclopedia of Chemical Technology," vol. 15, pp. 470–493 (3$^{rd}$ Edition 1981).

*Primary Examiner*—Samuel A. Acquah
(74) *Attorney, Agent, or Firm*—Zosan S. Soong

(57) ABSTRACT

An encapsulation process including: (a) forming an emulsion composed of a continuous phase comprising a first liquid, a cationic material, and an anionic material, and a disperse phase composed of a plurality of droplets of a second liquid, wherein a number of the droplets includes therein one to five particles; and (b) inducing complex coacervation of the cationic material and the anionic material to form a shell around each of the droplets.

24 Claims, 3 Drawing Sheets

ENCAPSULATION PROCESS

BACKGROUND OF THE INVENTION

Microcapsules have a variety of uses. Various microencapsulation techniques are available to fabricate these microcapsules. New microcapsules and microencapsulation techniques are desired to expand the applications in which microencapsulation technology may be useful.

Conventional microcapsules and microencapsulation techniques are described in "Kirk-Othmer Encyclopedia of Chemical Technology," Vol. 15, pp. 470–493 ($3^{rd}$ Edition 1981); Klaveness et al., U.S. Pat. No. 6,110,444; Jason et al., U.S. Pat. No. 5,540,927; Baker et al., U.S. Pat. No. 4,808,408.

The present microcapsules and microencapsulation technique may be used in the manufacture of components for display devices. Conventional display devices (some including microcapsules), components for display devices, and the manufacture of such display devices and their components are described in Sheridon, U.S. Pat. No. 5,604,027; Jacobson et al., U.S. Pat. No. 5,961,804; Jacobson et al., U.S. Pat. No. 5,930,026; Albert et al., U.S. Pat. No. 6,067,185; Crowley et al., U.S. Pat. No. 5,262,098; Sheridon, U.S. Pat. No. 5,344,594; and Stefik, U.S. Pat. No. 5,723,204.

SUMMARY OF THE INVENTION

The present invention is accomplished in embodiments by providing an encapsulation process comprising:
(a) forming an emulsion comprised of a continuous phase comprising a first liquid, a cationic material, and an anionic material, and a disperse phase comprising a plurality of droplets of a second liquid, wherein a number of the droplets includes therein one to five particles; and
(b) inducing complex coacervation of the cationic material and the anionic material to form a shell around each of the droplets.

There is also provided in embodiments an encapsulation process comprising:
(a) forming an emulsion comprised of a continuous phase comprising a first liquid, a cationic material, and an anionic material, and a disperse phase comprising a plurality of droplets of a second liquid, wherein a number of the droplets includes therein a single particle; and
(b) inducing complex coacervation of the cationic material and the anionic material to form a shell around each of the droplets.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

The term microcapsules refers to small capsules having a size ranging for example from about 1 micrometer to about 2,000 micrometers.

The phrase room temperature refers to a temperature of about 25 degrees C.

Figure 1:
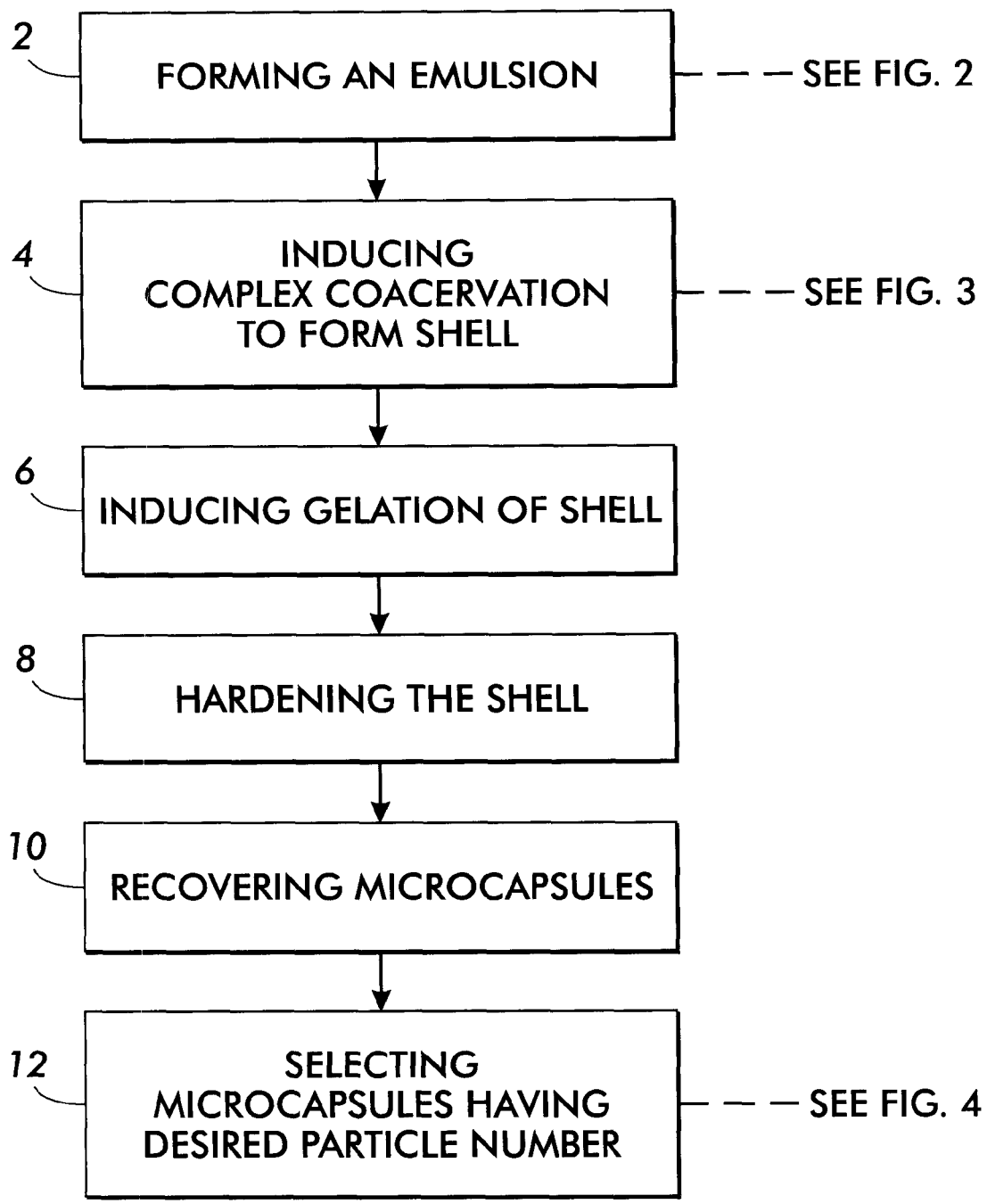
FIG. 1 is a flow diagram of the present encapsulation process.
Figure 2:
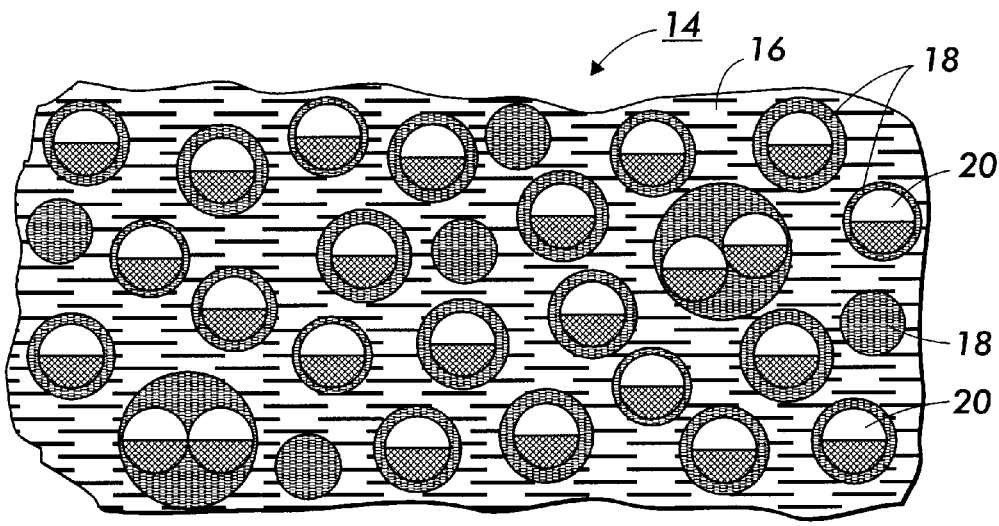
FIG. 2 is a simplified illustration depicting the emulsion at the conclusion of forming the emulsion.

FIG. 1 illustrates a preferred microencapsulation process to produce the plurality of microcapsules. Initially the process involves forming an emulsion (step 2 in FIG. 1) by adding in any sequence a cationic material, a first liquid, particles in a second liquid, and an anionic material. As seen in FIG. 2, the emulsion 14 is comprised of a continuous phase 16 comprising a first liquid, a cationic material, and an anionic material, and a disperse phase comprising a plurality of liquid droplets 18 of a second liquid, wherein a number of the droplets includes therein one to five particles 20. The cationic material and the anionic material may be added simultaneously or in any order. In one embodiment, the anionic material is added to become part of the emulsion only after the cationic material, the first liquid, and the particles in the second liquid are emulsified. In another embodiment, the anionic material is present in the starting composition (along with the cationic material, the first liquid, and the particles in the second liquid) where the starting composition is then emulsified.

Agitation is used to form the emulsion. The agitation time ranges for example from about 1 minute to about 30 minutes, preferably from about 5 minutes to about 20 minutes. The agitation speed ranges for example from about 200 rpm to about 1,500 rpm, preferably from about 400 rpm to about 1,000 rpm. Any suitable equipment may be used for agitation including for instance a 3-bladed impeller. In embodiments, an elevated temperature (i.e., a temperature above a room temperature of about 25 degrees C.) may be used to form the emulsion such as a temperature ranging for example from about 40 to about 80 degrees C., preferably from about 50 to about 60 degrees C.

The sequence of additions used to create the emulsion can be for example: (1) cationic material in first liquid+anionic material+second liquid (containing suspended particles); or (2) cationic material in first liquid+second liquid (containing suspended particles)+anionic material. Sequence (1) is the more preferred embodiment. For sequence (1), the anionic material may be added at a time period ranging from 0 (i.e., the anionic material is added all at once) to about 10 minutes (i.e., the anionic material is added over about 10 minutes), preferably from 0 to about 2 minutes; the second liquid (containing suspended particles) may be added at a time period ranging from 0 (i.e., the second liquid is added all at once) to about 30 minutes (i.e., the second liquid is added over about 30 minutes), preferably from 0 to about 15 minutes.

The various materials used to create the emulsion can be employed in the following illustrative amounts:
  cationic material to anionic material ratio, about 11:1 to about 1:1;
  first liquid to cationic material ratio, about 30:1 to about 10:1;
  second liquid (no suspended particles) to first liquid (no cationic material) ratio, about 1:1 to about 1:5; and
  percent solids (i.e., suspended particles) in second liquid, about 5% to about 50% by weight.

It is difficult to ensure that all of the droplets in the emulsion contain the same number of particles. Typically, the distribution number of particles within the droplets will be a continuum. The desired number of particles in each droplet may be for example 1, 2, 3, 4, or 5 particles. If the desired number of particles is for example a single particle within a droplet, a distribution may result where a first group of droplets has 0 particles contained therein, a second group of droplets has 1 particle contained therein, possibly a third group of droplets has 2 particles contained therein, possibly a fourth group of droplets will have 3 particles contained therein, and the like. The formation of the emulsion results in for example at least about 20% of the droplets containing particles of the desired number, preferably 20% to about 80% of the droplets containing particles of the desired number, and more preferably a majority of the droplets containing particles of the desired number. In embodiments, forming the emulsion results in a majority of the droplets having the single particle.

To increase the likelihood that a majority of the droplets contain only a single particle during formation of the emulsion, the following preferred procedures are employed: (1) add second liquid (containing suspended particles) after the anionic material; (2) use a baffled reaction flask (such as a Morton flask) for optimum mixing; and (3) add the second liquid (containing suspended particles) to the reaction in a slow, controlled manner (by using for example a syringe pump). The following parameters are preferred to increase the likelihood that a majority of the droplets contain only a single, particle during formation of the emulsion: an agitation speed ranging from about 650 rpm to about 1,000 rpm (using for example a 3-bladed impeller; a flow rate of adding the second liquid (containing suspended particles) ranging from about 2 grams per minute to about 30 grams per minute, preferably from about 9 grams per minute to about 12 grams per minute; percent solids (by weight) of suspended particles in second liquid (values for second liquid are without suspended particles) ranging from about 1 g/24 g to about 15 g/24 g, preferably, from about 8 g/24 g to about 12 g/24 g; and ratio (vol:vol) of second liquid (no particles) to first liquid (no cationic material) ranging from about 10 ml:230 ml to about 100 ml:230 ml, preferably from about 20 ml:230 ml to about 50 ml:230 ml.

For other desired particle numbers such as two, three, four, five, and the like, it is believed that a majority of the droplets containing the desired particle number can be created by trial and error in selecting the values for the various emulsion formation parameters. These emulsion formation parameters include for instance the following: mixer speed in rpm, flow rate of adding the second liquid (containing suspended particles), percent solids (i.e., suspended particles) in second liquid, and second liquid (no suspended particles) to first liquid (no cationic material) ratio.

The first liquid may be water or an aqueous mixture composed of water and one or more other water miscible fluids such as for example an alcohol like methanol and ethanol. In the aqueous mixture, water may be present in an amount ranging for example from about 20% to about 80% by volume, the balance of the volume being the one or more water miscible fluids.

The second liquid is preferably immiscible with the first liquid to the extent that droplets of the second liquid are formed in the emulsion.

The cationic material and the anionic material may be charged group-carrying polymers or macromolecules. Polymers of interest include linear and branched soluble polymers carrying one or more charges per monomer unit, and colloidal polymer particles with a high surface charge density. Macromolecules carrying relatively small numbers of charged groups, such as proteins, in particular albumin and gelatin, are also of interest. The cationic material may be of a single kind of cationic molecule or a mixture of two, three or more different cationic molecules. Similarly, the anionic material may be of a single kind of anionic molecule or a mixture of two, three or more different anionic molecules.

When complex coacervation is employed, the cationic material and the anionic material are oppositely charged polyelectrolytes which upon mixing will form a polyelectrolyte complex with low solubility in water, leading to coacervation and formation of a protective microencapsulating shell around each droplet. Suitable polyelectrolytes for the cationic material and the anionic material include, for example, anionic polymers such as polyphosphates (e.g., polyphosphorylated carbohydrates) and polycarboxylates (e.g., polyacrylates and polymethacrylates), which may be combined with cationic polymers such as poly-N-ethyl-4-vinylpyridine or poly-2,5-ionene bromide. Other examples of anionic polymers are polysaccharides and their derivatives such as acacia (gum arabic), carrageenan, agarose, alginic acid and salts thereof, heparin, hyaluronan, pectins and their derivatives such as sodium amylosulphate. These may be combined with cationic materials such as chitosan or cationic cellulose derivatives, e.g., from hydroxyethylcellulose, such as Polymer JR (Union Carbide). Further examples of the anionic material are inorganic salts. The inorganic salt may be for instance a polyphosphate. Inorganic polyphosphate materials include for example alkali metal phosphates, phosphate glasses, alkali metal hexametapolyphosphates such as sodium hexametaphosphates (trade name CALGON™). Other inorganic polyphosphates include HYPHOS™ ($Na_{12}P_{10}O_{31}$, which contains 65 wt % $P_2O_5$), HEXATREN™ R, and HEXATREN™ N, including those disclosed in U.S. Pat. No. 3,697,437, the disclosure of which is totally incorporated herein by reference.

Proteins are an important class of biological polyelectrolytes and are especially useful due to their biological acceptability, their ability to be precipitated by heating and their amphoteric character (being positively or negatively charged depending on the pH). For example serum albumin below its isoelectric point (pH=5.1) is positively charged and tends to precipitate in the presence of polyanions, but above the isoelectric point tends to associate with positively charged polymers such as polylysine. Other proteins which may be useful include collagen, gelatin, casein, insulin, fibrinogen. Polypeptides such as poly(L-omithine) are also useful and may be precipitated with negatively charged polyelectrolytes, for example, dextran derivatives such as carboxymethyldextran. Block polypeptides such as the anionic poly(alanine-glutamic acid) can also be used to cause coacervation.

Biocompatible low molecular weight ionic substances capable of linking two or more anionic or cationic groups at body pH values may also be used to generate and/or stabilize the shell. Thus metal ions such as $Ca^{2+}$, $Fe^{3+}$, or $Zn^{2+}$ have the ability to bind to two or more anionic groups of a polymer, whilst polyacids such as citric acid or tartaric acid may similarly bind to two or more cationic groups of a polymer.

The addition of surfactants may also be useful to stabilize the droplets during coacervation and/or to induce formation of the shell around the droplets. Thus, cationic surfactants such as cetyltrimethyl ammonium bromide may be combined with negatively charged polymers such as dextran derivatives. Anionic surfactants such as sodium dodecyl sulphate may similarly be used with positively charged polyelectrolytes such as gelatin at pHs below its isoelectric point. Non-ionic surfactants, e.g., sorbitan monolaurate, may also be useful in combination with the above mentioned cationic material and anionic material. In all these cases, the surfactant constitutes a component of the shell and contributes to the desired decrease in the solubility of the complex of the cationic material and the anionic material.

The second liquid may be for example an organic fluid. General classes for the second liquid include for example: (1) linear or branched aliphatic hydrocarbons (e.g., ISOPAR™); (2) halogenated hydrocarbons (e.g., chloroform, 1,2-dichoroethylene); (3) aromatic hydrocarbons (e.g., benzene and toluene); and low molecular weight polymers such as silicone oils like polydimethylsiloxanes (e.g., Dow Coming 200® fluid). Suitable materials for the second liquid include those described in U.S. Pat. No. 6,067,185, the disclosure of which is totally incorporated herein by reference.

The particles may be composed of any suitable material, where the composition of the particles depends upon their intended use. The particles can play a role in for example electronic display devices, carbonless copy paper systems, cosmetics, paints, adhesives, pesticides, pharmaceuticals, and other fields not specifically listed herein. Preferably, the particles are free to move in response to an applied field such as an electric field or a magnetic field. To allow movement of the one or more particles within the microcapsule in response to the applied field, the one or more particles are preferably spaced from the inner surface of the shell.

In preferred embodiments, the particles are used in electronic display devices where the particles are hemispheric bichromal balls which have an optical and an electrical anisotropy due to each hemisphere surface having a different color (e.g., one hemisphere is white and the other hemisphere is black) and electrical charge. The bichromal balls are free to rotate within the microcapsules in response to an applied electrical field. The bichromal balls are composed of the following illustrative materials: as the matrix, a polarizable material such as a polymer or a wax like polyethylene wax may be used; the white pigment may be titanium dioxide; and the black pigment may be magnetite ($Fe_2O_3$) or carbon black. Bichromal balls and their fabrication are described in U.S. Pat. Nos. 5,262,098; 5,344,594; and 5,604,027, the disclosures of which are totally incorporated herein by reference. In other embodiments, the bichromal balls can be made with magnetic anisotropy so that they are free to rotate within the microcapsules in response to an applied magnetic field. The particles (e.g., bichromal balls) may have a size ranging from about 20 to about 1,000 micrometers, preferably from about 50 to about 500 micrometers.

Figure 3:
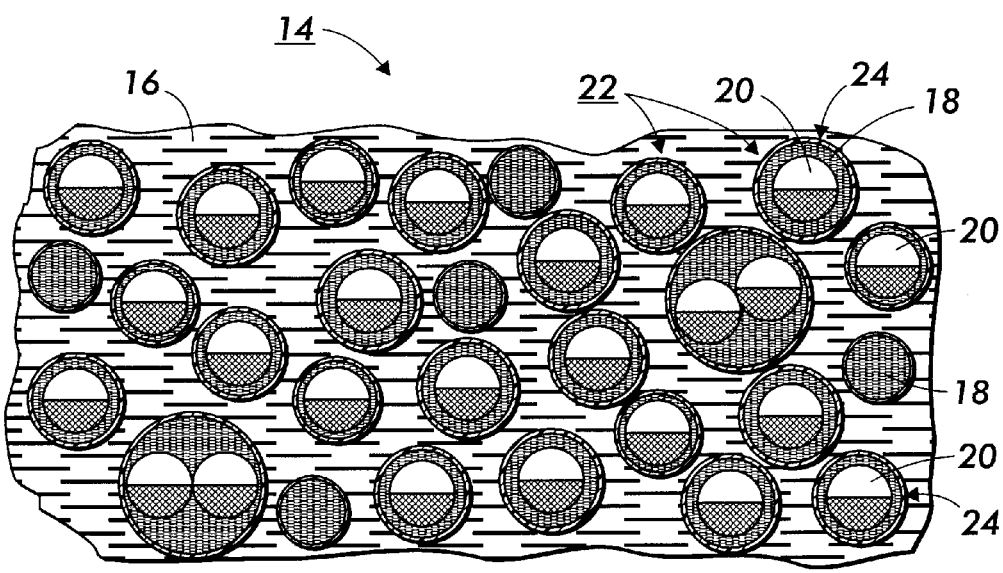
FIG. 3 is a simplified illustration depicting the microcapsules in the emulsion at the conclusion of inducing complex coacervation to form the shell.

The instant process then involves inducing complex coacervation of the cationic material and the anionic material to form a shell (step 4 of FIG. 1) composed of a complex of the cationic material and the anionic material around each of the droplets. FIG. 3 depicts the microcapsules 22 in the emulsion 14 at the conclusion of inducing the complex coacervation to form the shell 24. Any suitable technique for inducing complex coacervation may be employed including changing the emulsion pH, adding a liquid such as water to the emulsion, or a combination of techniques. Addition of an inorganic salt (such as sodium sulfate or ammonium sulfate) including those inorganic salts described in British Patent 920,868 may also be used to induce complex coacervation.

Regarding the changing of the emulsion pH to induce complex coacervation, a dilute mineral acid (such as HCl) may be used. In a preferred embodiment, acetic acid is used. The pH range may be from about 4 to about 5. In a preferred embodiment, the pH may be about 4.25 to about 4.75. Even more preferred is a pH ranging from about 4.3 to about 4.6.

Regarding the addition of a liquid such as water to the emulsion to induce complex coacervation, the liquid is added in an amount ranging from about 2.5 to about 15 wt % based on the emulsion including the added liquid (e.g., about 5 ml to about 30 ml for a 200 ml total solution). Preferably, the liquid is added in an amount ranging from about 5 to about 7.5 wt % based on the emulsion including the added liquid (e.g., about 10 ml to about 15 ml for a 200 ml total solution).

The emulsion temperature during inducing complex coacervation ranges for example from about 35 to about 65 degrees C., preferably from about 45 to about 55 degrees C. The elevated emulsion temperature is maintained until the shell is visually observed. For example, the elevated emulsion temperature may be maintained for a time of about 15 minutes. When the shell is visually observed, the emulsion is then cooled down to room temperature at a cool down rate ranging for example from about 0.3 to about 1 degree per minute.

The process in embodiments also involves inducing the gelation of the shell (step 6 of FIG. 1) such as by reducing the emulsion temperature to below room temperature, e.g., an emulsion temperature ranging from about 5 to about 15 degrees C. This emulsion temperature may be maintained for a time ranging from about 1 to about 10 minutes, preferably about 5 minutes. Inducing gelation of the shell may ensure complete solidification of the cationic material and anionic material.

The process in embodiments also optionally involves hardening the shell (step 8 of FIG. 1), preferably after inducing the gelation of the shell, by for example thermal treatment, desolvation techniques, cross-linking or coating with another polymer. Such second coating may be effected by further simple or complex coacervation or by immersing the coated microcapsules in a solution of a further polymer or macromolecule capable of forming complexes and penetrating into or depositing on the shell. Such hardening of the shell may improve properties such as the mechanical resilience and/or biocompatibility of the microcapsules.

A preferred technique to harden the shell is introducing a crosslinking agent into the emulsion where the cross-linking agent reacts with the cationic material and/or anionic material in the shell. The crosslinking agent may be added at the end of the inducing gelation where the emulsion temperature is below room temperature. The lower temperature slows the rate of cross-linking. During the hardening of the shell, the emulsion may be gradually warmed up to room temperature at a warming rate ranging from about 0.3 to about 1 degree per minute. In embodiments, the warming of the emulsion to room temperature may occur over a time period of about 20 minutes. The emulsion may be maintained at room temperature during the hardening of the shell for a time period ranging for example from about 5 to about 12 hours.

Typically, the crosslinking agent is an aldehyde. Tannin may also be used to harden the shell. The aldehyde cross-linking agent may be for instance formaldehyde, preferably glutaraldehyde. Other cross-linking agents include acroleine, glyoxal, and cinnamaldehyde. The crosslinking agent may be added in an amount ranging from about 0.1 to about 5 wt %, preferably from about 0.5 to about 1 wt %, based on the weight of the emulsion.

The process may involve recovering the microcapsules (step 10 of FIG. 1) involves separating them from the reaction mixture by techniques such as sedimentation, flotation or filtration involving for instance continuous or repeated washing.

Figure 4:
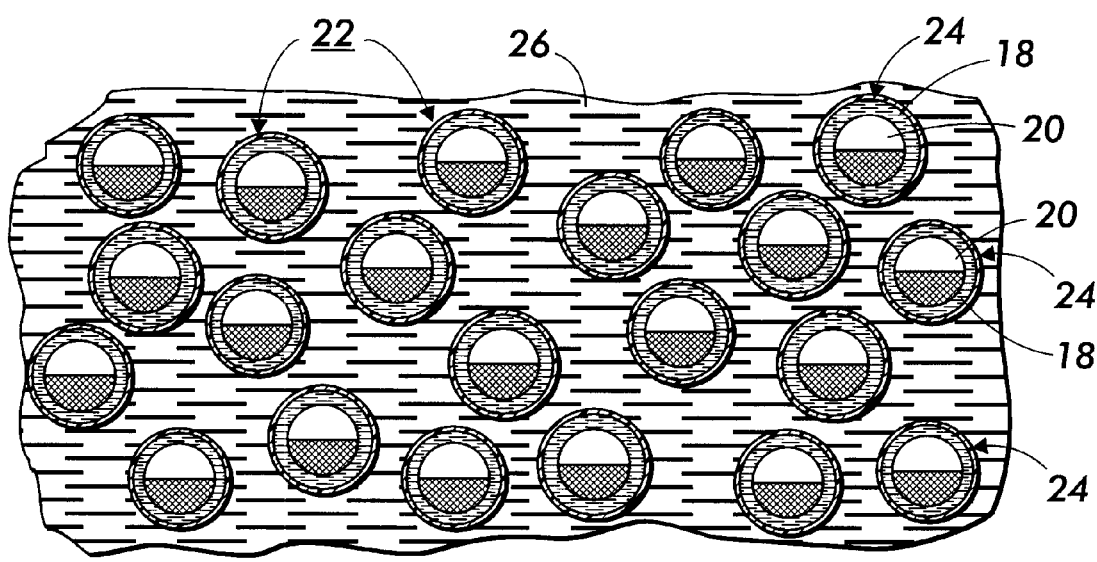
FIG. 4 is a simplified illustration depicting the microcapsules at the conclusion of selecting microcapsules having desired particle number.

Optionally, the present process further involves selecting microcapsules having the desired particle number (step 12 of FIG. 1). These microcapsules having the desired particle number may be separated and collected from the other microcapsules by any appropriate method including for example sorting by a human operator or by a sorting machine. FIG. 4 shows the selected microcapsules 22 in medium 26. The recovered microcapsules may be stored as a suspension in an appropriate diluent or in dried powder form in for example a closed vessel under a chosen gas atmosphere. Appropriate diluents for stored suspensions or for reconstitution of dried forms include sterile water, physiological saline and biocompatible buffers, such as phosphate-buffered saline. Other diluents include for example organic fluids. Where the diluent is an organic fluid, general classes for the diluent include for example: (1) linear or branched aliphatic hydrocarbons (e.g., ISOPAR™); (2) halogenated hydrocarbons (e.g., chloroform, 1,2-dichoroethylene); (3) aromatic hydrocarbons (e.g., benzene and toluene); and low molecular weight polymers such as silicone oils like polydimethylsiloxanes (e.g., Dow Corning 200® fluid of appropriate molecular weight). Polydimethylsiloxane oils come in various types, and they are often categorized by their viscosities in centistokes ("cSt"). They are commercially available from Aldrich. 0.65 cSt Dow Corning 200® fluid has a molecular weight ("Mw") of 162.38. 1 cSt Dow Corning 200® fluid has a Mw of 236.54. The Mw of 5 cSt Dow Corning 200® fluid is unknown.

The present microcapsules have continuous encapsulation and are preferably spherical, with a diameter ranging for example from about 10 micrometers to about 300 micrometers, preferably from about 50 micrometers to about 200 micrometers. The shell has a thickness ranging for example from about 0.5 micrometer to about 5 micrometers, preferably from about 1 micrometer to about 3 micrometers. The particles may be of any shape such as spherical or oblong. The particles have a diameter ranging for example from about 10 micrometers to about 100 micrometers, preferably from about 20 micrometers to about 60 micrometers. The volume contained by the shell exceeds the volume of the one or more encapsulated particle(s) by an amount ranging for example from about 15% to about 2,600%, preferably from about 30% to about 700%, more preferably from about 70% to about 250%. We arrive at these percentages by subtracting the volume of the one or more particle(s) from the volume contained by the shell, and then dividing by the volume of the one or more particle(s). For simplicity, these percentages are based on a spherical shell and spherical particle(s).

A preferred technique to measure the volume of the shell and of the particle(s) is visual observation with photographic image analysis, optical microscope, or scanning electron microscopy, determining for example the average values of three randomly chosen microcapsules.

Advantages of the present invention where the volume of the shell and particle(s) is in the specified values include increased contrast and viewing area of the particle(s) (for the hemispheric bichromal balls) and increased packing efficiency of the microcapsules.

The present microcapsules may be useful in any situation where microcapsules may be advantageously employed. The present microcapsules may be useful for example in electronic display devices, carbonless copy paper systems, cosmetics, paints, adhesives, pesticides, pharmaceuticals, and other fields not specifically listed herein. A preferred use of the present microcapsules is as visual indicators in for example a display device. Microcapsules as voltage sensitive members (i.e., where the particle or particles within the shell is movable in response to an applied field) will then indicate the voltage condition at their locations. When used in conjunction with an addressing means they can constitute an information display. Other uses might include the visualization or measurement of local electrical fields in test systems.

The present microcapsules may be dispersed into any suitable medium which may be a liquid, a solid, or a gas. When these microcapsules constitute voltage sensitive members, the microcapsules may be dispersed in any medium across which an electrical field may be impressed. Most commonly this medium will be a solid, with the particle or particles dispersed in this solid while it is in a liquid phase. It will be subsequently hardened by chemical reaction, by cooling, or the like. The medium may also be a liquid, or a slurry consisting of a liquid and solid particles, or solid particles whose purpose might be to immobilize the microcapsules. Indeed, any medium might be used to contain the microcapsules provided that it does not damage the shell of the microcapsule or diffuse undesirable chemicals across the shell.

The present invention allows the medium to be made for example from a large number of dielectric materials that are obtained by hardening a liquid phase of the material into which the microcapsules have been dispersed. In general, the shells will permit chemical isolation of the hardenable medium material from the fill (i.e., the liquid droplet and particle(s)) of the microcapsules, providing great freedom in choosing the medium. A particularly useful application of this technology is to mix the microcapsules with a transparent hardenable material, such as a varnish, and to paint or spray the resulting dispersion onto a surface, which may be nonplanar. In this way, one may not only obtain display surfaces that conform to objects of any shape, but one also obtains articles of decoration or camouflage. Simply applying electical fields will cause such surfaces to change color, inexpensively. Useful surfaces include structural members and fabrics, especially articles of clothing. In addition to being dispersed in the liquid that is subsequently hardened, the microcapsules can also be adhered to adhesives that are coated onto surfaces, typically forming monolayers. Thus, for example, an article of clothing could be coated with an adhesive and subsequently microcapsules could be adhered to the adhesive. Thereafter the color of that article of clothing could be altered by the application of electrical fields. Likewise, the surface of an object that there is an intention to conceal could be coated with a monolayer of microcapsules and a spatially varying voltage could be applied to these microcapsules to control the pattern of color on the surface of that object.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

In Examples 1–2 below, the impeller used was a 3-blade impeller, overall diameter was 1¼ inch, each blade was ½ inch in width, and the pitch of the blades was 45 degrees. For Example 1 using a 600 ml beaker, the inner diameter of the beaker was 3½ inches, and the depth was 4½ inches. For Example 2, the Morton flask dimensions were: 500 ml capacity, on the walls were 4 baffles symmetrically situated, each 1¾ inches long, protruding ½ inch into the vessel, and 2½ inches from the top of the flask. The flask dimensions were: 4 inches inner diameter, and 4 inches in depth.

EXAMPLE 1

In a 600 ml beaker (immersed in a 50 degrees C. water bath) was mixed 50 ml of a 10 wt % solution of gelatin (type A, 300 bloom, available from Aldrich, warmed to 50 degrees C.) with 50 ml of a 10 wt % suspension of hemispheric bichromal balls in ISOPAR™ M (a mixture of isoparaffinic hydrocarbons). The hemispheric bichromal balls had an optical and an electrical anisotropy due to each hemisphere surface having a different color (one hemisphere was white and the other hemisphere was black) and electrical charge. The bichromal balls had a size ranging from about 90 to about 106 micrometers and had a composition as described herein. The mixture was stirred at 800 rpm with a 3-bladed impeller. After 5 minutes, 210 ml of warm deionized water was added, followed by 50 ml of a 10 wt % solution of gum arabic (also at 50 degrees C.) all at once. Glacial acetic acid was added dropwise to lower the pH of the suspension from about 4.8 to about 4.15 (about 10 drops) over 5 minutes time. The heating bath was turned off, and the reaction was allowed to slowly cool to room temperature over several hours time. Ice was added to the cooling bath to cool the suspension down to 5 degrees C. over a time period of about 10 minutes, and 1.0 ml of gluteraldehyde (50% solution) was added all at once. The reaction was allowed to stir overnight (about 12 hours) and warm up to room temperature. The next day, stirring was stopped, and the microcapsules were allowed to float to the surface, and were skimmed off.

The following procedures were followed to demonstrate the electrical activity of the encapsulated bichromal balls. The microcapsules were dried with fuming silica (to remove residual water), dispersed in ISOPAR™ L, then placed between 2 glass plates coated with conductive indium tin oxide. A voltage of 100 V was applied across the plates, and rotation of the bichromal balls within the capsules was observed. The gap distance between the plates ranged from about 200 to about 300 micrometers. The microcapsule to particle ratio for their diameters ranged from about 1.5:1 to about 2:1, which corresponded to a volume contained by the shell exceeding the volume of the particle by an amount ranging from about 238% to about 700%.

EXAMPLE 2

In a 500 ml Morton flask (immersed in a 50 degrees C. water bath) was mixed 100 ml of a 10 wt % solution of gelatin (type A, 300 bloom, available from Aldrich), warmed to 50 degrees C. About 100 ml of warm deionized water was added followed by 20 ml of a 5 wt % solution of sodium polyphosphate. The mixture was stirred at 850 rpm with a 3-bladed impeller for about 5 minutes. Glacial acetic acid was added dropwise to lower the pH of the suspension from about 6.3 to about 4.5 over a time period of about 5 minutes. About 10 ml more of warm deionized water was added. After 5 minutes, 30 ml of a 10 wt % suspension of hemispheric bichromal balls (similar to the bichromal balls used in Example 1) in ISOPAR™ M were added. The heating bath was turned off, and the reaction was allowed to slowly cool to room temperature over several hours time. Ice was added to the cooling bath to cool the suspension down to 5 degrees C. over a time period of about 10 minutes, and 2.5 ml of gluteraldehyde (50% solution) was added all at once. The reaction was allowed to stir overnight (about 12 hours) and warm up to room temperature. The next day, stirring was stopped, and the microcapsules were allowed to float to the surface, and were skimmed off.

The following procedures were followed to demonstrate the electrical activity of the encapsulated bichromal balls. The microcapsules were dried with fuming silica to remove residual water (or alternatively the microcapsules can be freeze-dried to remove residual water), dispersed in ISOPAR™ L, then placed between 2 glass plates coated with conductive indium tin oxide. A voltage of 100 V was applied across the plates, and rotation of the bichromal balls within the capsules was observed. The gap distance between the plates ranged from about 200 to about 300 micrometers. The microcapsule to particle ratio for their diameters ranged from about 1.5:1 to about 2:1, which corresponded to a volume contained by the shell exceeding the volume of the particle by an amount ranging from about 238% to about 700%.

Other modifications of the present invention may occur to those skilled in the art based upon a reading of the present disclosure and these modifications are intended to be included within the scope of the present invention.

We claim:

1. An encapsulation process comprising:
   (a) forming an emulsion comprised of a continuous phase comprising a first liquid, a cationic material, and an anionic material, and a disperse phase comprising a plurality of droplets of a second liquid, wherein a number of the droplets includes therein one to five particles; and
   (b) inducing complex coacervation of the cationic material and the anionic material to form a shell around each of the droplets, thereby resulting in a plurality of capsules where the shell encapsulates the droplet and the one to five particles, where in the capsules the volume contained by the shell is insufficient to accommodate another similarly-sized particle that is in addition to the one to five particles.

2. The process of claim 1, further comprising:
   (c) inducing the gelation of the shell.

3. The process of claim 2, further comprising:
   (d) hardening the shell subsequent to the inducing the gelation of the shell.

4. The process of claim 1, wherein the volume contained by the shell exceeds the volume of the one to five particles by an amount ranging from about 15% to about 2,600%.

5. The process of claim 1, wherein the volume contained by the shell exceeds the volume of the one to five particles by an amount ranging from about 30% to about 700%.

6. The process of claim 1, wherein the volume contained by the shell exceeds the volume of the one to five particles by an amount ranging from about 70% to about 250%.

7. An encapsulation process comprising:
   (a) forming an emulsion comprised of a continuous phase comprising a first liquid, a cationic material, and an anionic material, and a disperse phase comprising a plurality of droplets of a second liquid, wherein a number of the droplets includes therein a single particle; and
   (b) inducing complex coacervation of the cationic material and the anionic material to form a shell around each of the droplets.

8. The process of claim 7, further comprising:

(c) inducing the gelation of the shell.

9. The process of claim 8, further comprising:

(d) hardening the shell subsequent to the inducing the gelation of the shell.

10. The process of claim 7, wherein the first liquid is water.

11. The process of claim 7, wherein the second liquid is an organic fluid.

12. The process of claim 7, wherein the forming the emulsion results in a majority of the droplets having the single particle.

13. The process of claim 7, wherein the cationic material is a gelatin.

14. The process of claim 7, wherein the anionic material is a polyphosphate.

15. The process of claim 7, wherein the inducing the complex coacervation is accomplished by changing the emulsion pH.

16. The process of claim 7, wherein the inducing the complex coacervation is accomplished by changing the emulsion pH to about 4.15.

17. The process of claim 8, wherein the inducing the gelation of the shell is accomplished by lowering the emulsion temperature.

18. The process of claim 7, wherein the particle exhibits at least one color and the shell and the second liquid are sufficiently transparent to see the color of the particle.

19. The process of claim 7, wherein the particle is movable in response to an applied field.

20. The process of claim 7, wherein the particle exhibits two colors.

21. The process of claim 7, wherein the volume contained by the shell exceeds the volume of the particle by an amount ranging from about 15% to about 2,600%.

22. The process of claim 7, wherein the volume contained by the shell exceeds the volume of the particle by an amount ranging from about 30% to about 700%.

23. The process of claim 7, wherein the volume contained by the shell exceeds the volume of the particle by an amount ranging from about 70% to about 250%.

24. The process of claim 7, wherein there results a plurality of capsules where the shell encapsulates the droplet and the single particle, where in the capsules the volume contained by the shell is insufficient to accommodate another similarly-sized particle that is in addition to the single particle.

* * * * *